United States Patent [19]

Yamaguchi et al.

[11] Patent Number: 4,663,217

[45] Date of Patent: May 5, 1987

[54] MAGNETIC RECORDING MEDIUM

[75] Inventors: Nobutaka Yamaguchi; Shinobu Iida; Masahiro Utsumi; Norio Nasu; Eiichi Tadokoro, all of Kanagawa, Japan

[73] Assignee: Fuji Photo Film Co., Ltd., Kanagawa, Japan

[21] Appl. No.: 767,240

[22] Filed: Aug. 19, 1985

Related U.S. Application Data

[63] Continuation of Ser. No. 586,390, Mar. 5, 1984, abandoned.

[30] Foreign Application Priority Data

Mar. 4, 1983 [JP] Japan .................................. 58-35468

[51] Int. Cl.[4] .............................................. B32B 5/16
[52] U.S. Cl. .................................... 428/212; 428/323; 428/423.1; 428/474.4; 428/694; 428/698
[58] Field of Search .................... 428/212, 323, 423.1, 428/474.4, 694, 900; 360/131, 134

[56] References Cited

U.S. PATENT DOCUMENTS

| | | |
|---|---|---|
| 4,135,031 | 1/1979 | Akashi et al. .................. 428/446 |
| 4,135,032 | 1/1979 | Akashi et al. .................. 428/900 |
| 4,273,797 | 6/1981 | Akashi et al. .................. 427/10 |
| 4,310,599 | 1/1982 | Akashi et al. .................. 428/694 |
| 4,419,406 | 12/1983 | Isobe et al. .................... 428/694 |

*Primary Examiner*—George F. Lesmes
*Assistant Examiner*—William M. Atkinson
*Attorney, Agent, or Firm*—Sughrue, Mion, Zinn, Macpeak & Seas

[57] ABSTRACT

A magnetic recording medium comprised of a nonmagnetic support base having a magnetic recording layer on one surface thereof and a backing layer on the other surface thereof is disclosed. The backing layer is comprised of (1) carbon black having a particle size in the range of 10 to 150 m$\mu$, (2) graphite having a particle size of 3$\mu$ or less, and (3) a curing agent. By utilizing this particular backing layer the resulting recording medium has improved durability with respect to the backing layer and shows a decreased in the number of dropouts and scratches during use.

16 Claims, No Drawings

MAGNETIC RECORDING MEDIUM

This is a continuation of application Ser. No. 586,390, filed Mar. 5, 1984, now abandoned.

FIELD OF THE INVENTION

The present invention relates to a magnetic recording medium comprising a support having provided thereon a backing layer to improve durability of the magnetic recording medium.

BACKGROUND OF THE INVENTION

Durability of magnetic recording media is required because the media are usually wound at high speed.

Hitherto, a backing layer has been provided to the support to improve the durability. Graphite particles and carbon black may be incorporated into the backing layer as disclosed in Japanese Patent Publication No. 10241/74. In the conventional backing layer, carbon black having a chain structure is incorporated to elastically maintain graphite particles in order to prevent the graphite particles from coming off the backing layer. However, carbon black does not sufficiently prevent the dropping off of graphite particles from the backing layer and is not effective for decreasing drop out and scratches on the backing layer.

SUMMARY OF THE INVENTION

An object of the present invention is to provide a magnetic recording medium having an improved durability of the coated backing layer as well as having decreased drop out and scratches on the backing layer.

The above object of the present invention can be attained by a magnetic recording medium comprising a nonmagnetic support having a magnetic recording layer on one surface thereof and a backing layer on the opposite surface thereof, the backing layer containing (1) carbon black, (2) graphite, and (3) a curing agent.

DETAILED DESCRIPTION OF THE INVENTION

Carbon black which can be used in this invention is not particularly limited, but the carbon black preferably has an average particle size of about 10 to about 150 m$\mu$, more preferably 50 to 100 m$\mu$. If the particle size is smaller than about 10 m$\mu$, the durability of the resulting backing layer tends to decrease. If the particle size is larger than about 150 m$\mu$, surface unevenness of the resulting backing layer increases and is transferred to the surface of a magnetic recording layer when the magnetic recording medium is wound thereby deteriorating electgromagnetic properties of the medium.

Graphite which can be used in this invention preferably has an average particle size of about 0.01 $\mu$m to 3 $\mu$m, more preferably 0.01 $\mu$m to 1 $\mu$m, most preferably 0.01 $\mu$m to 0.5 $\mu$m.

If the particle size of the graphite is larger than about 0.5 $\mu$m, graphite particles tend to drop off from the backing layer and make it difficult to filter the coating composition for a backing layer.

Graphite can be of various shapes such as flakes, granules, lumps or soils, both natural and artificial graphite can be used. The mixing ratio of the graphite and carbon black is preferably about 10:1 to about 1:10, more preferably 5:1 to 1:5 and most preferably 3:1 to 1:3 by weight.

If the mixing ratio of graphite to carbon black is too large, the backing layer tends to be easily scraped off. The powders which are scraped off tend to stain guiding systems of video tape recorders (VTR), causing drop out and scratches and deteriorates running properties. On the other hand, if the ratio of graphite to carbon black is too small, the graphite does not provide sufficient lubricity, deteriorating running properties and causing scratches and drop out.

In order to obtain the effect of this invention, graphite should preferably be used in such an amount that the total amount of carbon black and graphite is 100 to 175 wt%, more preferbly 110 to 160 wt%, and most preferably 120 to 150 wt%, based on the total amount of the binder used in a backing layer.

Any conventional polyisocyanates as described in, for example, U.S. Pat. No. 4,439,486 filed Mar. 12, 1982 can be used as a curing agent in the present invention.

Examples of suitable curing agent include ethanediisocyanate, decanediisocyanate, 1-methylbenzole-2,4,6-triisocyanate, triphenylmethane-4,4"4"-triisocyanate, an adduct of 1 mole of trimethylolpropane and 3 moles of toluylenediisocyanate, etc.

Further, polyamides can also be used as a curing agent in the present invention.

The curing agent can be used in an amount of 5 to 80 parts by weight, preferably 10 to 50 parts by weight, per 100 parts by weight of the binder.

Resins as described in U.S. Pat. No. 4,135,016 can be used as a binder for the backing layer in the magnetic recording medium of the present invention. The resins can be used alone or in combination. Also, other additives can be added to the resins.

Additives for a backing layer include inorganic pigments such as magnesium silicate, calcium carbonate, aluminum silicate, barium sulfate or clay; organic particles such as benzoguanamine; abrasives, surfactants and lubricants which are used in the magnetic recording layer hereinafter described, if necessary.

The inorganic pigments and organic particles are added in order to control unevenness of the surface of the coated backing layer, improve resistance to scratches of the backing layer, adjust the viscosity of a coating liquid and adjust the color of the backing layer. These materials are described in, for example, U.S. Pat. No. 4,273,797.

A ferromagnetic particle used in this invention, a method for preparing a magnetic coating composition, a binder used in a magnetic recording layer and a backing layer, additives used for a magnetic recording layer (e.g., a dispersing agent, a lubricant, an abrasive, a surface activec agent, an antistatic agent and the like), a method for preparing a support and a magnetic recording medium are disclosed in U.S. Pat. No. 4,135,016.

The present invention is further illustrated in more detail by the following Examples, but the present invention is not limited thereto. In the examples, all parts are by weight.

EXAMPLE 1

| | |
|---|---|
| Co—added $\gamma$-Fe$_2$O$_3$ (particle size, 0.35$\mu$, acicular ratio, 1:8; coercive force, 650 Oe) | 300 parts |
| Vinyl chloride-vinyl acetate copolymer (weight ratio, 87:13; degree of polymerization, 420) | 30 parts |
| Polyester polyurethane (synthesized from butylene adipate and | 30 parts |

-continued

| | |
|---|---|
| 4,4'-diphenylmethane diisocyanate; styrene equivalent molecular weight, about 130,000) | |
| Cr₂O₃ | 12 parts |
| Lecithin | 6 parts |
| Dimethyl polysiloxane | 3 parts |
| Butyl acetate | 600 parts |

The above composition was dispersed in a ball mill for 48 hours. To the dispersion was added 40 parts (solid content: 30 parts) of "Desmodule L-75" manufactured by Bayer Co., Ltd. (a 75 wt% ethyl acetate solution of an adduct of 1 mole of trimethylolpropane and 3 moles of toluylenediisocyanate) and the mixture was dispersed for 30 minutes. Then, the dispersion was filtrated by a filter having an average pore size of 1 to prepare a magnetic coating composition.

A polyethylene terephthalate film having a thickness of 14μ which had been coated with a coating composition for a backing layer having the following composition was coated and the above with the magnetic coating composition on the surface opposite the backing layer by a doctor coating method. The magnetic layer was subjected to magnetic orientation in a machine direction and to calendering treatment. The resulting magnetic recording medium was then slit into a width of ½ inch to prepare a video tape for VHS (Sample No. 1).

| | |
|---|---|
| Carbon black ("furnace black", average particle size, 60 mμ) | 300 parts |
| Graphite (average particle size, 1μ) | 300 parts |
| Curing agent ("Desmodule L-75") | 133 parts |
| Nitrocellulose | 300 parts |
| Methyl ethyl ketone | 2000 parts |
| Methyl isobutyl ketone | 2000 parts |

The above composition for the backing layer (except for the hardening agent) was dispersed in a ball mill for 40 hours. To the dispersion was then added the curing agent and, after adjusting the viscosity of the mixture, it was filtrated by a filter having a pore size of 5μ and coated.

The dry thickness of the magnetic recording layer was 5μ and that of the backing layer was 1.5μ.

EXAMPLE 2

The same procedure as described in Example 1 was repeated except that the following coating composition for a backing layer was used to prepare Sample No. 2.

| | |
|---|---|
| Carbon black ("furnace black", 95 mμ) | 300 parts |
| Graphite (0.5μ) | 150 parts |
| Curing agent ("Desmodule L-75") | 100 parts |
| Talc powder (3μ) | 150 parts |
| red iron oxide (0.5μ) | 50 parts |
| Vinyl chloride-vinyl acetate-vinyl alcohol copolymer (degree of polymerization, 400; weight ratio of vinyl chloride:vinyl acetate:vinyl alcohol = 85:10:5) | 300 parts |
| Cyclohexanone | 500 parts |
| Methyl ethyl ketone | 3000 parts |

COMPARATIVE EXAMPLE 1

Sample No. 3 was prepared in the same manner as described in Example 1 except that nitrocellulose was used instead of the curing agent in the coating composition for the backing layer in the same amount (solid content) as the hardening agent.

Sample No. 4 was prepared in the same manner as in Example 1 except that graphite was used instead of carbon black.

Sample No. 5 was prepared in the same manner as described in Example 1 except that carbon black was used instead of graphite.

COMPARATIVE EXAMPLE 2

Sample No. 6 was prepared in the same manner as described in Example 1 except that nitrocellulose was used instead of the curing agent in the coating composition for the backing layer in the same solid amount, and that the amount of the binder was increased to a weight ratio of (carbon black and graphite) to (binder) of 60 wt%.

EXAMPLE 3

Example Nos. 7 to 10 were prepared in the same manner as described in Example 1 except that the weight ratio of (carbon black and graphite) to (binder) was adjusted to 80 wt%, 100 wt%, 175 wt% and 200 wt%, respectively.

EXAMPLE 4

Sample Nos. 11 and 12 were prepared in the same manner as described in Example 1 except that graphite in the backing layer had an average particle size of 0.2μ and 3μ, respectively.

EXAMPLE 5

Sample No. 13 was prepared in the same manner as described in Example 4 for preparing Sample No. 11 except that a copolymer of vinyl chloride and vinyl acetate in Example 2 was used instead of nitrocellulose in the backing layer.

Results of evalution of Sample Nos. 1 to 13 obtained by VHS type VTR are shown in Table 1.

It is apparent that Sample No. 1 of this invention has less drop out and less scratches and markedly improved durability as compard with Comparative Sample Nos. 3 to 6 prepared in a conventional manner. It is clear from the comparison between Sample No. 1 and Sample Nos. 3 to 5, that the effect of this invention can be obtained by the backing layer which simultaneously contains (1) carbon black, (2) graphite and (3) a curing agent. It is also clear from the comparison of Sample Nos. 9, 7, 1, 8 and 10 that better characteristics can be obtained when the weight ratio of the total amount of carbon black and graphite to the total amount of binder is 100 to 175 wt%. If the total amount of carbon black and graphite is higher, the binder cannot be completely maintained, causing increased drop out. If the total amount is lower, the amount of the binder is excessive, resulting in poor running properties and uneven winding.

It is apparent from the comparison of Sample Nos. 1, 11 and 12 that when graphite having a larger size is used, scratches tend to occur slightly thereby causing drop out. It is believed that such graphite particles are larger as compared with the thickness of a backing layer and therefore are easily scraped off.

As is apparent from comparison of Sample Nos. 11 and 13, nitrocellulose is the most effective binder for the backing layer.

TABLE

| Example | Sample No. | Carbon Black (A) | Graphite (B) | Curing agent Desmodule L-75 | Binder (C) | Weight ratio of [(A + B)/C] (wt. %) | Drop out 5° C. number/min. | Number of scratches at 60° C. 80% relative humidity | |
|---|---|---|---|---|---|---|---|---|---|
| Example 1 | 1 | furnace black 60 mμ | 1μ | present | Nitrocellulose | 150 | 5 | 1 | |
| Example 1 | 2 | furnace black 95 mμ | 0.5μ | " | Vinyl chloride/vinyl acetate copolymer | 120 | 4 | 2 | |
| Comparative Example 1 | 3 | furnace black 60 mμ | 1μ | absent | Nitrocellulose | 150 | 95* | 37* | *Flakes drop off. |
| Comparative Example 1 | 4 | absent | 1μ | present | " | " | 80 | 21* | *Squeal occurred from 30 passes. |
| Comparative Example 1 | 5 | furnace black 60 μ | absent | " | " | " | 65 | 19* | *Tape squeal occurred from 90 passes. |
| Comparative Example 2 | 6 | furnace black 60 mμ | 1μ | absent | " | 60 | 300* | 50* ** | *Flakes dropped off. **Tape squeal occurred from 15 passes. |
| Example 3 | 7 | furnace black 60 mμ | " | present | Nitrocellulose | 100 | 5 | 2 | |
| Example 3 | 8 | furnace black 60 mμ | " | " | " | 175 | 5 | 2 | |
| Example 3 | 9 | furnace black 60 mμ | " | " | " | 80 | 22 | 15* | *Tape squeal occurred from 120 passes. |
| Example 3 | 10 | furnace black 60 mμ | " | " | " | 200 | 18* | 12 | *Flakes drop off, a little |
| Example 4 | 11 | furnace black 60 mμ | 0.2μ | " | " | 150 | 2 | 1 | |
| Example 4 | 12 | furnace black 60 mμ | 3μ | " | " | " | 10* | 5 | *Flakes drop off, a little |
| Example 5 | 13 | furnace black 60 mμ | 0.2μ | " | Vinyl chloride/vinyl acetate copolyer | " | 8 | 6 | |

The evaluations shown in the above Table were conducted in the following manner.

The drop out was evaluatd by allowing a VTR to stand in a dry thermostatic room at 5° C., repeatedly running a sample tape (200 passes) which had been mounted in a VTR cassette, and recording and reproducing a signal. The drop out was visually counted on a TV monitor and expressed in terms of the number of drop out per minute having a signal ratio more than 1/5 H (Horizon). The lower the number, the higher the durability.

The scratches were determined by running a sample tape (200 passes) in a VTR at 60° C. and 80% relative humidity and counting the number of scratches on the backing layer by a 50 magnification microscope. The scratches were expressed in terms of the number of scratches per 5 mm of tape width. The lower the number, the higher the durability.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, comprising:
   a non-magnetic support base having provided thereon:
   a recording layer on one surface of the support base; and
   a backing layer on an opposite surface of the support base, the backing layer comprising:
   (1) carbon black having a particle size in the range of 50 mμ to 100 mμ;
   (2) graphite particles having a particle size of 0.01 μm to 1μ;
   (3) a binder; and
   (4) a curing agent, wherein the ratio by weight of the graphite to the carbon black is in the range of about 3:1 to 1:3 and wherein the total amount of the carbon black and the graphite is in the range of 100 to 175 wt% based on the total amount of the binder used in the backing layer.

2. A magnetic recording medium as claimed in claim 1, wherein the graphite has a particle size of 0.5μ or less.

3. A magnetic recording medium as claimed in claim 1, wherein said backing layer further comprises a binder and wherein the total amount of the carbon black and the graphite is in the range of 110 to 160 wt% based on the total amount of the binder used in the backing layer.

4. A magnetic recording medium as claimed in claim 1, wherein said backing layer further comprises a binder and wherein the total amount of the carbon black and the graphite is in the range of 120 to 150 wt% based on the total amount of the binder used in the backing layer.

5. A magnetic recording layer as claimed in claim 1, wherein said backing layer consists essentially of said carbon black, said graphite particles, a binder and said curing agent.

6. A magnetic recording medium as claimed in claim 1, wherein the curing agent is a polyisocyanate or a polyimide and the curing agent is present in an amount of from 5 to 80 parts by weight based on 100 parts by weight of the binder.

7. A magnetic recording medium as claimed in claim 6, wherein the amount of curing agent is 10 to 50 parts by weight based on 100 parts by weight of the binder.

8. A magnetic recording medium as claimed in claim 7, wherein the recording layer comprises Co-added $Y\text{-}Fe_2O_3$.

9. A magnetic recording medium as claimed in claim 1, wherein the graphite has a particle size of 0.01 μm to 0.5 μm and the total amount of the carbon black and graphite is in the range of 110 to 160 wt% based on the total amount of the binder used in the backing layer.

10. A magnetic recording medium as claimed in claim 9, wherein the curing agent is a polyisocyanate or a polyimide and the curing agent is present in an amount of from 5 to 80 parts by weight based on 100 parts by weight of the binder.

11. A magnetic recording medium as claimed in claim 10, wherein the amount of curing agent is 10 to 50 parts by weight based on 100 parts by weight of the binder.

12. A magnetic recording medium as claimed in claim 11, wherein the recording layer comprises Co-added $Y$-$Fe_2O_3$.

13. A magnetic recording medium as claimed in claim 1, wherein the graphite has a particle size of 0.01 μm to 0.5 μm and the total amount of the carbon black and graphite is in the range of 120 to 150 wt% based on the total amount of the binder used in the backing layer.

14. A magnetic recording medium as claimed in claim 13, wherein the curing agent is a polyisocyanate or a polyimide and the curing agent is present in an amount of from 5 to 80 parts by weight based on 100 parts by weight of the binder.

15. A magnetic recording medium as claimed in claim 14, wherein the amount of curing agent is 10 to 50 parts by weight based on 100 parts by weight of the binder.

16. A magnetic recording medium as claimed in claim 15, wherein the recording layer comprises Co-added $Y$-$Fe_2O_3$.

* * * * *